Sept. 20, 1960 — L. C. GAUL — 2,953,153
VENTED SAFETY CHECK VALVE
Filed Feb. 28, 1958
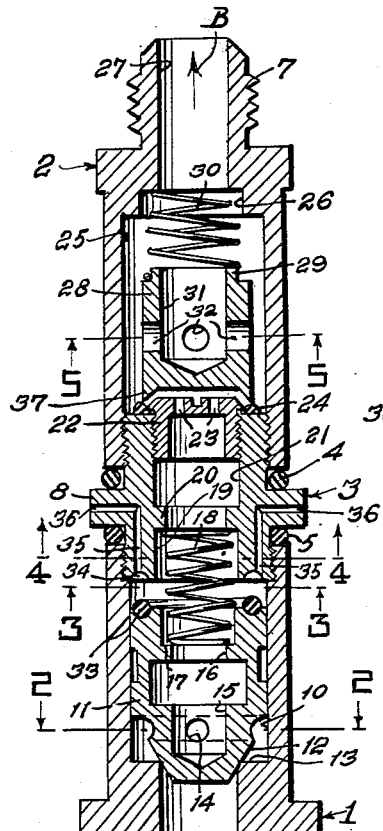
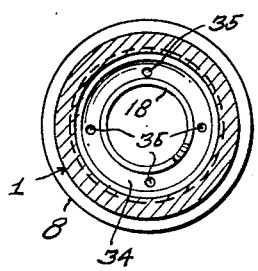
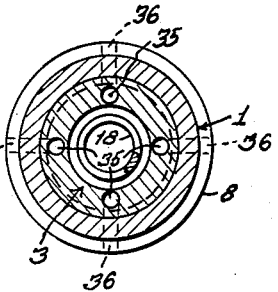
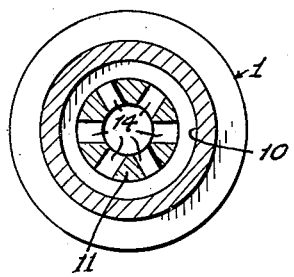
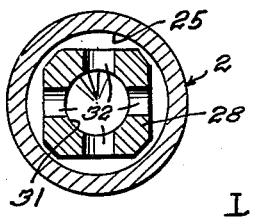
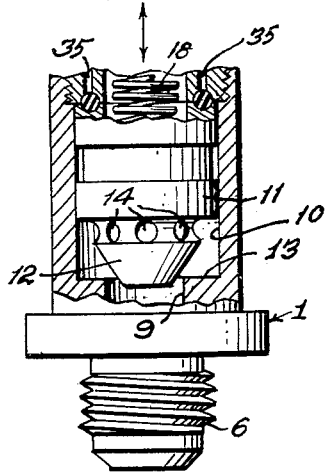
INVENTOR.
Leslie C. Gaul
BY
W. E. Thibodeau & T. J. Lynch

United States Patent Office 2,953,153
Patented Sept. 20, 1960

2,953,153

VENTED SAFETY CHECK VALVE

Leslie C. Gaul, Monrovia, Calif., assignor to the United States of America as represented by the Secretary of the Army Filed Feb. 28, 1958, Ser. No. 718,390

2 Claims. (Cl. 137—218)

This invention relates to a vented safety check valve and more particularly to a valve comprising a double check unit with a safety arrangement for giving a positive warning when the master check valve fails to function. The valve of the invention may be used in any critical checking application for either liquid or gas.

It is a primary object of this invention to provide a double check safety valve arranged to give a positive warning upon failure of the master check valve.

It is another object of the invention to provide a valve adapted upon failure of the main check valve to seal off the upstream flow and vent any leaking gas through radial ports to the atmosphere.

It is a further object to provide a vented safety check valve, reliable of operation and easily dismantled for replacement of parts.

The invention will be best understood from a consideration of the following detailed description taken in connection with the accompanying drawing, it being understood, however, that the invention is not limited by the specific illustration or description but that such illustration and description constitutes a preferred embodiment of the invention.

In the drawing:

Fig. 1 is an axial section taken through a valve constructed in accordance with the invention, the valve being shown in closed position, Fig. 2 is a cross sectional view taken along line 2—2 of Fig. 1, Fig. 3 is a cross sectional view taken along line 3—3 of Fig. 1, Fig. 4 is a cross sectional view taken along line 4—4 of Fig. 1, Fig. 5 is a cross sectional view taken along line 5—5 of Fig. 1, and, Fig. 6 is a fragmental detail view, partly in section, illustrating the check valve in elevation and in its closed position.

Referring more particularly to the drawing and to Fig. 1 wherein there is illustrated the valve of the invention in its assembled position. A indicates the upstream side of the valve and B the downstream side. 1 indicates generally the upstream valve body and 2 indicates generally the downstream valve body, both bodies housing valve operating elements. Bodies 1 and 2 are joined axially by a coupler indicated generally by 3 which is externally threaded at each end thereof for engaging internally threaded ends of bodies 1 and 2. O-rings 4 and 5 provide a seal between the coupler 3 and bodies 1 and 2. Both bodies 1 and 2 are cylindrical and are provided with externally threaded ends 6 and 7 for attachment to a supply line (not shown). Coupler 3 is also cylindrical in shape and is provided with an annular medial portion 8 of larger diameter than the rest of the coupler to provide a shoulder to act as a seat for O-rings 4 and 5.

Body 1 housing the valve elements of the upstream check valve, is bored as at 9 to provide an inlet port and is counter bored as at 10. An upstream valve piston 11 is slidably mounted in counter bore 10 and is provided with a conical face 12 at its upstream side which acts to seat on a shoulder 13 formed by the inlet port 9 and counter bore 10. A plurality of radial ports 14 pierce the conical face of piston 11 to communicate with an axial internal bore 15 which communicates into the downstream side of counter bore 10. Piston 11 is closed at its upstream end as bore 15 does not extend entirely through the piston. Piston 11 is counter bored as at 16 forming a shoulder 17. A coil spring 18 is seated at one of its ends in counter bore 16 and rests against shoulder 17. The other end of spring 18 is received in a first axial bore 19 in coupler 3 and bears against a shoulder 20 formed by a second axial bore 21 in coupler 3. Axial bore 21 is internally threaded at its downstream side to receive a threaded retainer plug 22 which has openings 23 for the passage of fluid. Plug 22 serves to retain an O-ring 24 for a purpose to be later described.

Downstream valve body 2 is axially bored as at 25, counter bored as at 26 and again as at 27, bore 27 serving as an outlet port. Slidably mounted in bore 25 is a piston 28 acting as the master check valve member. Piston 28 is square in cross-section and when assembled in bore 25, which is cylindrical, affords spaces between its sides and the wall of the body 2 for the purpose of preventing entrapment of gases in case of valve failure. Piston 28 is provided with a reduced annular boss 29 on its downstream side to receive one end of a coil spring 30, the other one of which is received in counterbore 26 and bears against the shoulder formed by the counterbore 26 and outlet port 27. Piston 28 is partially bored axially as at 31 and a plurality of radial bores 32 communicate between bore 25 and bore 31 through piston 28.

Seal between the axial bore 21 of coupler 3 and piston 28 is provided and comprises an annular rim 37 on the upstream side of piston 28 which seals on O-ring 24 when the master check valve is in closed position.

A safety bleed-off for gases accumulating through valve failure is provided and consists of an O-ring 33 carried by the downstream face of piston 11. An annular groove 34 is provided in the upstream face of coupler 3. Axial ports 35 lead off from the annular groove 34 and connect with radial ports 36 which communicate with atmosphere.

The operation of the valve is as follows:

When, for example, a gas (or liquid) is applied in the free flow direction (A to B) as in Fig. 1, the gas impinges upon the conical face 12 of piston 11 moving it in a downstream direction (see Fig. 6) and compresses spring 18. Valve face 12 is lifted from its seat permitting gas to flow from inlet port 9 through radial ports 14 and into bore 10. As piston 11 moves into its downstream direction, O-ring 33 seats in annular groove 34 sealing axial ports 35 in coupler 3. Gas then passes into axial bores 19 and 21 of coupler 3 to impinge on the upstream face of piston 28 thereby breaking the seal formed by rim 37 and O-ring 24 thereby moving piston 28 in a downstream direction against the bias of spring 30. Gas will then pass into bore 25, radial ports 32 and into bore 31 and out bore 27 downstream.

Upon cessation of gas flow, spring 30 will return the master piston 28 in an upstream direction to seat on O-ring 24 by rim 37 forcing the seal to close the valve.

Should master piston 28 fail to seat its rim 37 properly on O-ring 24 by presence of foreign matter or the like, failure of spring 30, etc., gas accumulating in the valve will tend to leak into the upstream side of the valve and as piston 11 is closed and the seal between the piston and annular groove 34 is broken, the gas will vent through axial ports 35 and radial ports 36 into the atmosphere and the failure of the master check valve can be readily detected.

From the foregoing, it is readily apparent that a highly reliable and economical means has been devised to detect faulty valve seating in a line valve. Its applications to fluid lines of all types is highly practical. Due to its unique construction, assembly, replacement of parts and dismantlement is quick and requires little or no special tools.

It is to be understood that the form of invention, herein shown and described is to be taken as a preferred example of the same, and that various charges in the shape, size and arrangements of parts may be resorted to without departing from the spirit of the invention, or scope of the subjoined claims.

What is claimed is:

1. In a vented safety check valve, a first axially bored housing disposed in the upstream side of said valve, a second axially bored housing being disposed in the downstream side of said valve, an axially bored coupling body detachably securing said first and second housings in an axially aligned relation, a first spring biased piston slidable in said first housing adapted to seal said upstream side of said valve, a second spring biased piston slidable in said second housing, means for sealing the downstream side of said valve comprising a plug having ports therein, said plug being detachably secured in axial relation in said coupling body, an O-ring secured to the downstream face of said coupling body by said plug, said second piston defining an annular rim on its upstream face adapted to seat on said O-ring and seal said axial bore in said coupling body, means for detecting malfunction of said sealing means between said second piston and said coupling comprising an annular groove in the upstream face of said coupling body, a first plurality of axially disposed ports in said coupling body, said ports communicating between said groove and a second plurality of radial ports in said coupling body communicating to atmosphere and means sealing said radial ports comprising an O-ring carried by the downstream face of said first piston, said O-ring adapted to seat in said annular groove when said first piston moves to the downstream side of said first housing.

2. In a vented safety check valve, a first housing disposed in the upstream side of said valve, said housing having an axial bore and a coaxial counterbore therein, said axial bore and counterbore forming a shoulder therebetween at the junction thereof, a second axially bored housing disposed in the downstream side of said valve, an axially bored coupling body detachably securing said first and second housings in an axially aligned relation, a first spring biased piston slidable in said counterbore in said first housing, said piston having a conical face on its upstream side for seating on said shoulder to seal between said upstream side of said valve, a second spring biased piston slidable in said second housing, means for sealing the downstream side of said valve, said means comprising a plug detachably and axially secured in the downstream side of said coupling body, said plug having fluid passageways therein and an enlarged annular head having a beveled edge, an O-ring secured on said coupling body by said head whereby a portion of said O-ring extends beyond said head, there being an undercut portion having a beveled inner peripheral rim on the upstream end of said second piston, said rim adapted to seat on said head and said O-ring on said coupling body when said second piston is moved to the upstream side of said second housing, and means for detecting malfunction of said sealing means between said second piston and said coupling body comprising an annular groove formed in the upstream face of said coupling body, a plurality of axially disposed ports in said coupling body communicating between said axial ports and the atmosphere, and means for sealing said last named axial and radial ports comprising an annular groove in the downstream side of said first piston and an O-ring having its lower portion seated in said last named groove, the upper portion of said O-ring being adapted to seat in said groove in said coupling body when said first piston moves to the downstream side of said first housing.

References Cited in the file of this patent

UNITED STATES PATENTS

| 2,306,012 | Campbell | Dec. 22, 1942 |
| 2,322,631 | Groeniger | June 22, 1943 |
| 2,591,514 | Courtot | Apr. 1, 1952 |
| 2,616,512 | Coon | Nov. 4, 1952 |
| 2,646,815 | Leventhal | July 28, 1953 |
| 2,650,793 | Clark | Sept. 1, 1953 |
| 2,758,609 | Dickert | Aug. 14, 1956 |
| 2,893,418 | Leventhal | July 7, 1959 |

FOREIGN PATENTS

| 527,201 | Great Britain | Oct. 3, 1940 |